(12) United States Patent
Banker et al.

(10) Patent No.: US 9,188,045 B2
(45) Date of Patent: Nov. 17, 2015

(54) NON-INTRUSIVE EXHAUST GAS SENSOR MONITORING BASED ON FUEL VAPOR PURGE OPERATION

(75) Inventors: Adam Nathan Banker, Plymouth, MI (US); Michael James Ulrich, West Bloomfield, MI (US); Imad Hassan Makki, Dearborn Heights, MI (US); James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 13/599,744

(22) Filed: Aug. 30, 2012

(65) Prior Publication Data

US 2014/0067235 A1    Mar. 6, 2014

(51) Int. Cl.
 F02D 41/00    (2006.01)
 F01N 11/00    (2006.01)
 F02D 41/14    (2006.01)
 F02D 41/12    (2006.01)

(52) U.S. Cl.
 CPC ............ *F01N 11/007* (2013.01); *F02D 41/003* (2013.01); *F02D 41/1495* (2013.01); *F02D 41/0035* (2013.01); *F02D 41/123* (2013.01); *Y02T 10/47* (2013.01)

(58) Field of Classification Search
 CPC ............ F02D 41/1486; F02D 41/1495; F02D 41/222; F02D 41/1479; F02D 41/1482; F02D 41/149; F02D 41/40

USPC .......................... 688/682, 688, 690, 698, 699
 See application file for complete search history.

(56) References Cited

U.S. PATENT DOCUMENTS

| 5,423,307 | A | * | 6/1995 | Okawa | F02D 41/0042 123/698 |
| 5,979,160 | A | * | 11/1999 | Yashiki | F01N 11/007 60/276 |
| 6,151,889 | A | * | 11/2000 | Davey | F01N 11/007 60/274 |
| 6,568,240 | B1 | * | 5/2003 | Sato | F02D 41/0045 73/1.07 |
| 7,913,672 | B2 | | 3/2011 | Elwart et al. | |
| 7,949,462 | B2 | * | 5/2011 | Akimoto | F02D 41/40 60/277 |
| 8,505,370 | B2 | * | 8/2013 | Miller | G01M 15/102 73/114.69 |
| 2006/0016174 | A1 | | 1/2006 | Surnilla et al. | |
| 2007/0084195 | A1 | | 4/2007 | Surnilla et al. | |

* cited by examiner

*Primary Examiner* — Thomas Moulis
(74) *Attorney, Agent, or Firm* — Julia Voutyras; Alleman Hall McCoy Russell & Tuttle LLP (57) ABSTRACT

A method of monitoring an exhaust gas sensor coupled in an engine exhaust in an engine is provided. The method includes adjusting engine operation responsive to exhaust gas sensor degradation, the degradation identified during deceleration fuel shut-off (DFSO) and compensated based on whether vapor purge operation is occurring in the engine during DFSO.

20 Claims, 5 Drawing Sheets

NON-INTRUSIVE EXHAUST GAS SENSOR MONITORING BASED ON FUEL VAPOR PURGE OPERATION

FIELD

The present disclosure relates to an exhaust gas sensor in a motor vehicle and method for monitoring the exhaust gas sensor.

BACKGROUND AND SUMMARY

An exhaust gas sensor may be positioned in an exhaust system of a vehicle to detect an air/fuel ratio of exhaust gas exhausted from an internal combustion engine of the vehicle. The exhaust gas sensor readings may be used to control operation of the internal combustion engine to propel the vehicle.

Degradation of an exhaust gas sensor may cause engine control degradation that may result in increased emissions and/or reduced vehicle drivability. In particular, an exhaust gas sensor may exhibit six discrete types of degradation behavior. The degradation behavior types may be categorized as asymmetric type degradation (e.g., rich-to-lean asymmetric delay, lean-to-rich asymmetric delay, etc.) that affects only lean-to-rich or rich-to-lean exhaust gas sensor response rates, or symmetric type degradation (e.g., symmetric delay) that affects both lean-to-rich and rich-to-lean exhaust gas sensor response rates. The delay type degradation behaviors may be associated with the initial reaction of the exhaust gas sensor to a change in exhaust gas composition.

Previous approaches to monitoring exhaust gas sensor degradation, particularly identifying one or more of the six degradation behaviors, have relied on intrusive data collection. That is, an engine may be purposely operated with one or more rich-to-lean or lean-to-rich transitions to monitor exhaust gas sensor response. Attempts have also been made to monitor exhaust gas sensor degradation during a deceleration fuel shut-off (DFSO) transition to perform an unobtrusive diagnostic operation. However, vapor purge operation may negatively affect exhaust gas degradation monitoring during DFSO. For example, if vapor purging operation is implemented in the engine during sensor monitoring, the exhaust gas sensor may be incorrectly diagnosed. For instance, an indication of sensor degradation may be provided when the sensor is properly functioning or vice-versa. Other attempts have been made to inhibit this incorrect diagnosis simply by inhibiting sensor diagnostics when fuel vapor purge operation is occurring. However, this may limit window for sensor diagnostics and as a result decrease the number diagnostic operations performed. Consequently, combustion operation may be degraded when a degraded sensor is not diagnosed in a desired time period.

The Inventors herein have recognized the above issues and identified a non-intrusive approach for exhaust gas sensor diagnostics that may be performed during vapor purge operation. In one embodiment, a method of monitoring an exhaust gas sensor coupled in an engine exhaust in an engine is provided. The method includes adjusting engine operation responsive to exhaust gas sensor degradation, the degradation identified during deceleration fuel shut-off (DFSO) and compensated based on whether vapor purge operation is occurring in the engine during DFSO.

Adjusting engine operation based exhaust gas sensor degradation and compensating the degradation based on vapor purge operation decreases the likelihood of sensor misdiagnosis, thereby increasing the confidence of the sensor diagnostic method. Additionally, correcting sensor diagnostics for purge operation enables sensor diagnostics to be performed over a wider range of engine operating conditions. As a result, periods of sensor malfunction without degradation identification are reduced. Additionally, by determining degradation of an exhaust gas sensor using a non-intrusive approach with data collected during DFSO, exhaust gas sensor degradation monitoring may be performed in a simple manner.

In one example, the exhaust gas sensor degradation may be based on a line length and a time delay of a set of exhaust gas sensor response samples collected during DFSO. The exhaust gas sensor time delay and line length may provide a robust signal that has less noise and higher fidelity than previous approaches. In doing so, the accuracy of the sensor degradation determination may be improved.

In a further example, adjusting engine operation responsive to exhaust gas sensor degradation may include adjusting an amount of fuel injection and/or timing of fuel injection in response to exhaust gas sensor degradation. In this way, the combustion operation may be adjusted to account for sensor malfunction to improve combustion operation and decrease emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

The following description relates to an approach for determining degradation of an exhaust gas sensor. More particularly, the systems and methods described below may be implemented to determine exhaust gas sensor degradation during a deceleration fuel shut-off (DFSO) transition based on vapor purge operation in the engine. Specifically, if it is determined the fuel vapor purge operation is occurring during exhaust gas sensor monitoring a compensation factor may be applied to a diagnostic algorithm to account for the change in air fuel ratio caused by the purge operation. In this way, a robust diagnostic algorithm may be unobtrusively employed during DFSO and the likelihood of misdiagnosis of the exhaust gas sensor caused by fuel vapor purge operation is greatly reduced.

Figure 1:
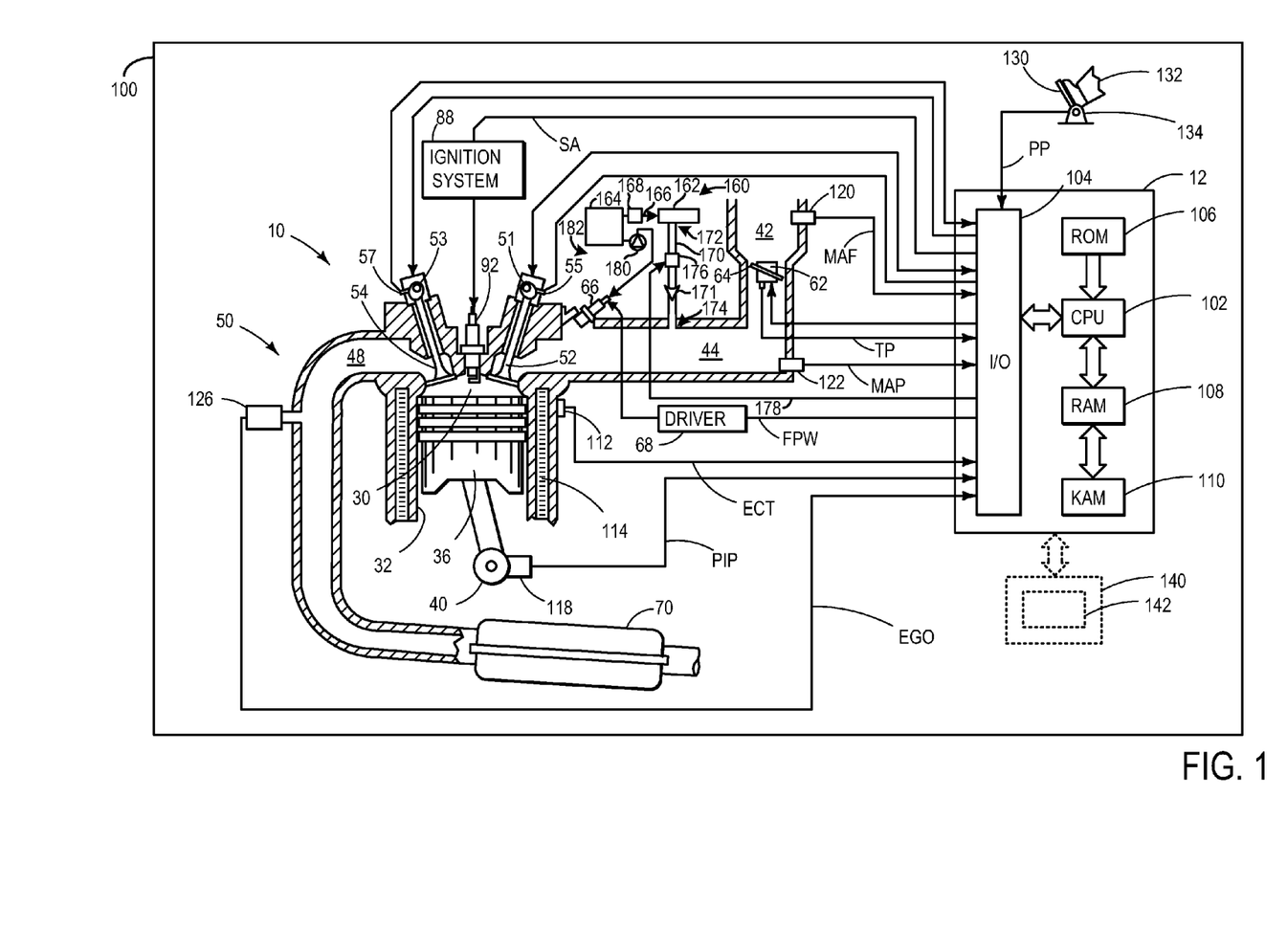
FIG. 1 shows a schematic diagram of an example propulsion system of a vehicle including an exhaust gas sensor.
Figure 8A:
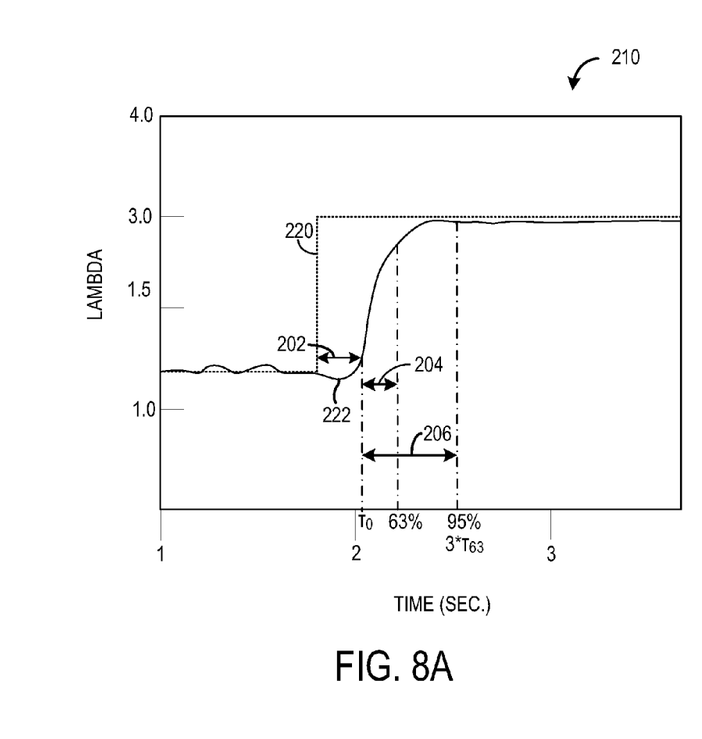
FIG. 8A shows a graph indicating an entry into DFSO when vapor purge operation is not being performed.
Figure 8B:
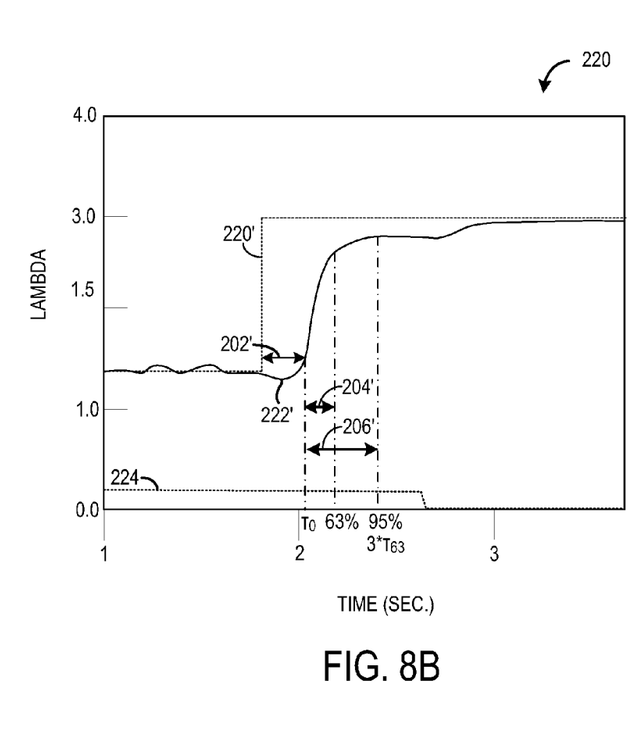
FIG. 8B shows a graph indicating an entry into DFSO while vapor purge operation is being performed.
Figure 9:
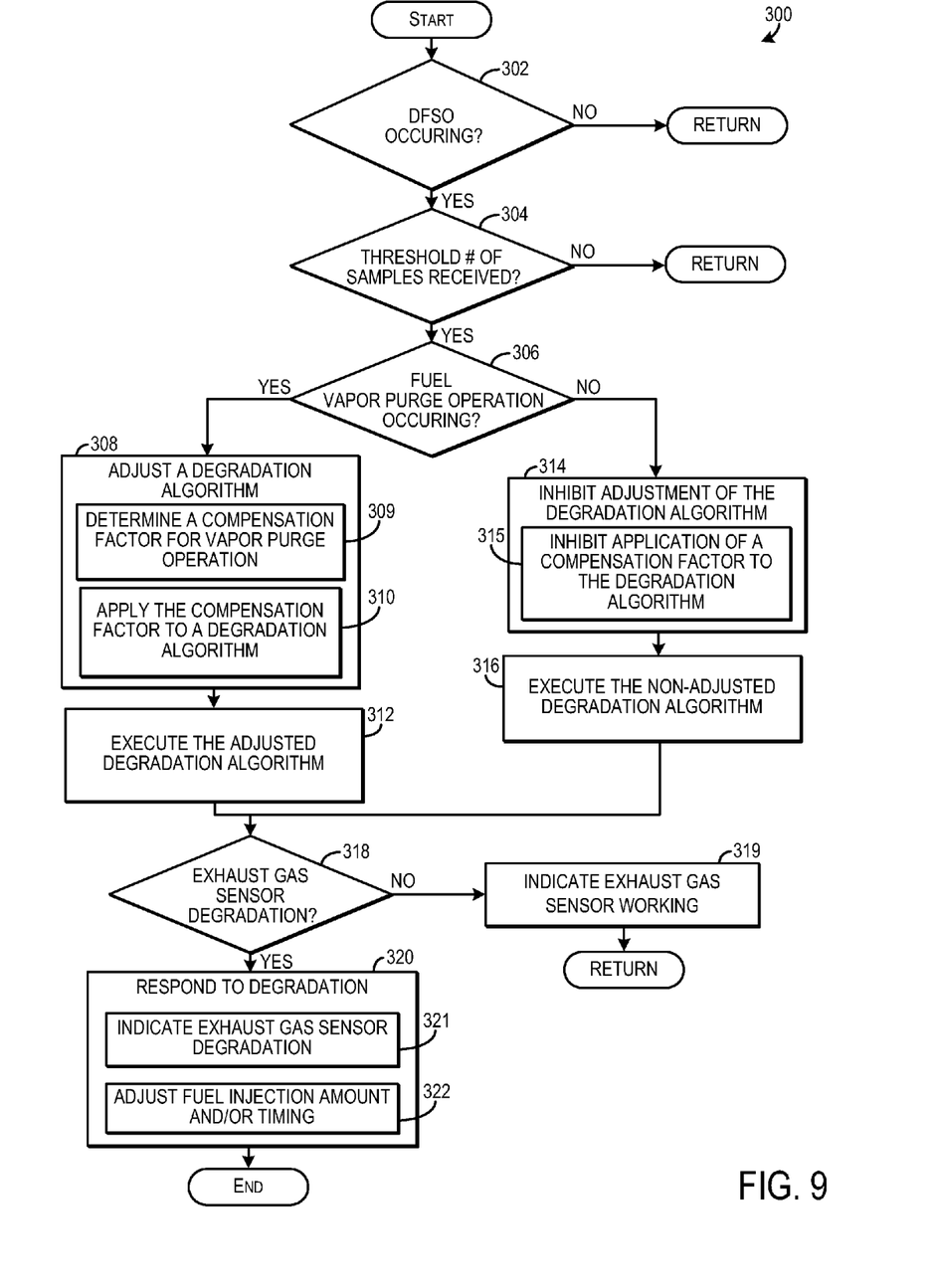
FIG. 9 is a flow chart illustrating a method for indicating exhaust gas sensor.
Figure 10:
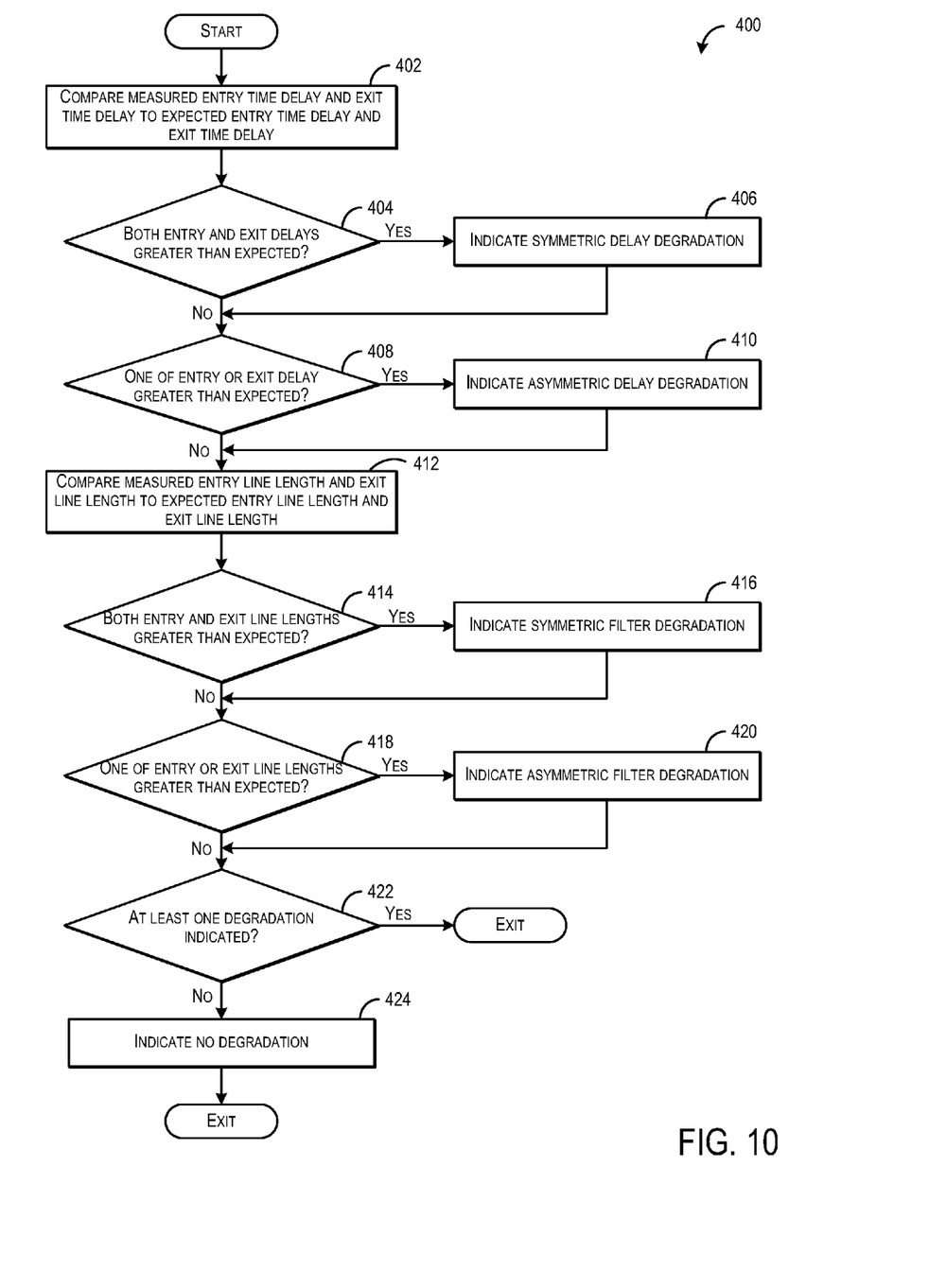
FIG. 10 is a flow chart illustrating a method for indicating exhaust gas sensor degradation.

FIG. 1 shows an engine including an exhaust gas sensor. FIGS. 2-7 show expected and degraded lambda for each of the six degradation behaviors of the exhaust gas sensor including a response with an air-fuel ratio disturbance. FIGS. 8A-8B show example exhaust gas sensor responses during DFSO operation. FIGS. 9-10 are example methods that may be carried out by the engine to determine a degradation behavior.

FIG. 1 is a schematic diagram showing one cylinder of multi-cylinder engine 10, which may be included in a propulsion system of a vehicle 100 in which an exhaust gas sensor 126 (e.g., air-fuel sensor) may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves. A throttle 62 including a throttle plate 64 is positioned in the intake passage 42. The throttle is configured to adjust the amount of airflow flowing to the combustion chamber 30.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 70.

Emission control device 70 is shown arranged along exhaust passage 48 downstream of exhaust gas sensor 126. Emission control device 70 may be a three way catalyst (TWC), NOx trap, various other emission control devices, or combinations thereof. In some examples, emission control device 70 may be a first one of a plurality of emission control devices positioned in the exhaust system. In some examples, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may used in the exhaust gas sensor degradation determination method described in further detail below. For example, the inverse of the engine speed may be used to determine delays associated with the injection-intake-compression-expansion-exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air fuel ratio which may occur during DFSO and the exhaust gas sensor response rate.

In some examples, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 and may send engine control signals and degradation determination information among other communications to controller 12.

Note storage medium read-only memory 106 and/or processing resources 142 can be programmed with computer readable data representing instructions executable by processor 102 and/or dedicated controller 140 for performing the methods described below as well as other variants.

FIG. 1 also shows a fuel-vapor purge system 160. The fuel-vapor purge system includes a fuel-vapor storage canister 162. The fuel-vapor storage canister 162 (e.g., carbon canister) may be in fluidic communication with a fuel tank 164, a fuel tank fill line, etc. In some examples, the fuel tank 164 may be included in the fuel-vapor purge system 160. A vapor line, denoted via arrow 166, couples the fuel-vapor storage canister 162 to the fuel tank 164. Thus, fuel vapor may flow through the vapor line 166. The fuel tank 164 may house a suitable fuel such as gasoline, diesel, bio-diesel, alcohol (e.g., ethanol, methanol), etc. A valve 168 may be coupled to the vapor line 166. The valve 168 is configured to adjust the amount of vapor that flows from the fuel tank 164 to the fuel-vapor storage canister 162. The fuel-vapor storage canister 162 may be a carbon canister including activated carbon for storing fuel vapor.

The fuel-vapor purge system further includes a vapor purge conduit 170. Arrow 171 denotes the general flow of fuel vapor through the vapor purge conduit 170. As shown, the vapor purge conduit 170 includes an inlet 172 in fluidic communication with the fuel-vapor storage canister 162 and an outlet 174 in fluidic communication with the intake manifold 44. It will be appreciated that other vapor purge conduit outlet locations have been contemplated such as in an intake conduit upstream of the intake manifold 44 and/or throttle 62. A vapor purge valve 176 is coupled to the vapor purge conduit 170. The vapor purge valve 176 is configured to adjust the amount of vapor flowing through the vapor purge conduit into the intake system. For example, the vapor purge valve 176 may have an open position where vapor is allowed to flow from fuel vapor storage canister 162 to the intake manifold 44 and a closed position where fuel vapor is substantially inhibited from flowing from the fuel vapor storage canister to the intake manifold. The controller 12 is in electronic communication with the vapor purge valve 176, denoted via signal line 178 and the valve 168. Therefore, the controller 12 may be configured to implement a vapor purge strategy. For example, the controller 12 may be configured to open the vapor purge valve 176 during DFSO operation and in particular during a DFSO transition in which the engine is entering into or exiting from DFSO. As described herein DFSO may be an operation in the engine of the vehicle where fuel supply to the combustion chamber 30 is suspended and then may be subsequently unsuspended. For example, when the throttle is substantially closed and the engine speed is above a threshold value entry into DFSO may be initiated. Likewise, when a request for acceleration is received by the controller 12 (e.g., the throttle is opened) and/or the engine speed falls below the threshold value exit out of DFSO may be initiated. In this way, fuel economy in the vehicle may be increased. Additionally or alternatively DFSO may be triggered based on engine temperature. It will be appreciated that other DFSO triggers and techniques have been contemplated.

Furthermore, the fuel tank 164 is in fluidic communication with a fuel pump 180. The outlet of the fuel pump 180 is in fluidic communication with the fuel injector 66. In this way, fuel is supplied to the fuel injector. The fuel tank 164, the fuel pump 180, and/or the fuel injector 66 may be included in a fuel injection system 182. The fuel injection system 182 may be included in the engine 10. The fuel injection system may be configured to deliver fuel to the intake manifold and/or directly to the combustion chamber at predetermined tine intervals.

As discussed above, exhaust gas sensor degradation may be determined based on any one, or in some examples each, of six discrete behaviors indicated by delays in the response rate of air/fuel ratio readings generated by an exhaust gas sensor during rich-to-lean transitions and/or lean-to-rich transitions. FIGS. 2-7 each show a graph indicating one of the six discrete types of exhaust gas sensor degradation behaviors. The graphs plot air/fuel ratio (lambda) versus time (in seconds). In each graph, the dotted line indicates a commanded lambda signal that may be sent to engine components (e.g., fuel injectors, cylinder valves, throttle, spark plug, etc.) to generate an air/fuel ratio that progresses through a cycle comprising one or more lean-to-rich transitions and one or more rich-to-lean transitions. In the depicted figures, the engine is entering into and exiting out of DFSO. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

Figure 2:
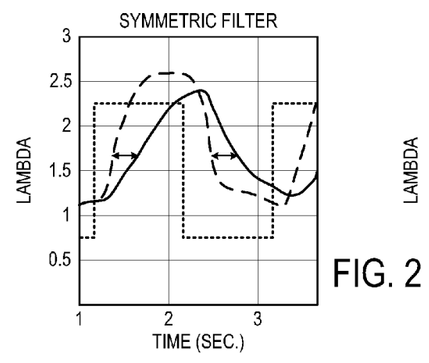
FIG. 2 shows a graph indicating a symmetric filter type degradation behavior of an exhaust gas sensor.

FIG. 2 shows a graph indicating a first type of degradation behavior that may be exhibited by a degraded exhaust gas sensor. This first type of degradation behavior is a symmetric filter type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

Figure 3:
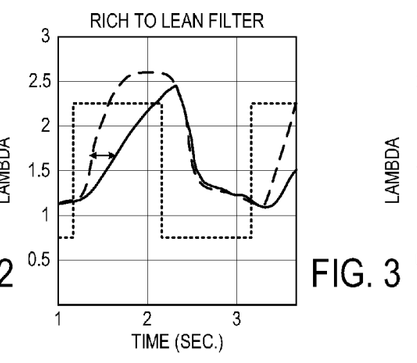
FIG. 3 shows a graph indicating an asymmetric rich-to-lean filter type degradation behavior of an exhaust gas sensor.

FIG. 3 shows a graph indicating a second type of degradation behavior that may be exhibited by a degraded exhaust gas sensor. The second type of degradation behavior is an asymmetric rich-to-lean filter type that includes slow exhaust gas sensor response to the commanded lambda signal for a transition from rich-to-lean air/fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

Figure 4:
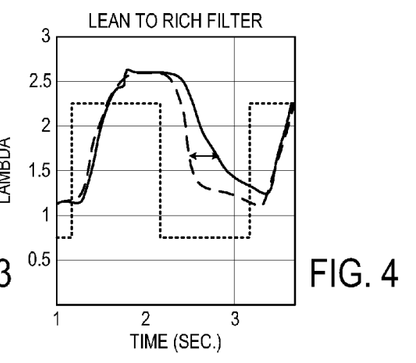
FIG. 4 shows a graph indicating an asymmetric lean-to-rich filter type degradation behavior of an exhaust gas sensor.

FIG. 4 shows a graph indicating a third type of degradation behavior that may be exhibited by a degraded exhaust gas sensor. The third type of behavior is an asymmetric lean-to-rich filter type that includes slow exhaust gas sensor response to the commanded lambda signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

Figure 5:
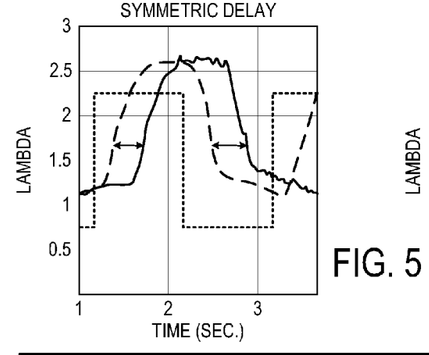
FIG. 5 show a graph indicating a symmetric delay type degradation behavior of an exhaust gas sensor.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

Figure 6:
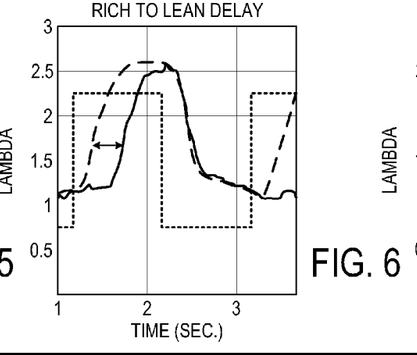
FIG. 6 shows a graph indicating an asymmetric rich-to-lean delay type degradation behavior of an exhaust gas sensor.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air/fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

Figure 7:
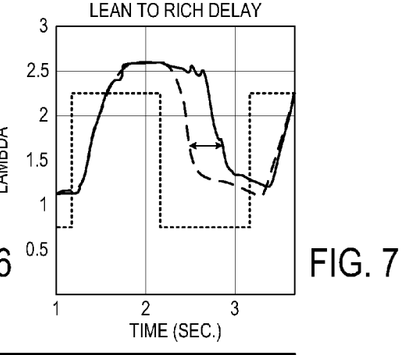
FIG. 7 shows a graph indicating an asymmetric lean-to-rich delay type degradation behavior of an exhaust gas sensor.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air/fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

It will be appreciated that a degraded exhaust gas sensor may exhibit a combination of two or more of the above described degradation behaviors. For example, a degraded exhaust gas sensor may exhibit an asymmetric rich-to-lean filter degradation behavior (i.e., FIG. 3) as well as an asymmetric rich-to-lean delay degradation behavior (i.e., FIG. 6).

FIGS. 8A and 8B show graphs illustrating example exhaust gas sensor responses to a commanded entry into DFSO. It will be appreciated that each graph may be plotted with a set of exhaust gas sensor response samples collected during a DFSO transition. The exhaust gas sensor responses shown in FIGS. 8A and 8B may be responses from the exhaust gas sensor 126, shown in FIG. 1, or another suitable exhaust gas sensor. The exhaust gas sensor response may include lambda values, as shown, as well as air-fuel ratios. Specifically, the samples may include lambda values collected during the exhaust gas sensor response to the commanded entry or exit of DFSO. For example, a set of samples may include every lambda value collected during a response to a commanded entry into DFSO, e.g., the set of samples may include a lambda value collected every 10 ms, 100 ms, etc.

FIG. 8A shows a graph 210 illustrating an entry into DFSO without vapor purge operation occurring, and FIG. 8B shows a graph 220 illustrating an entry into DFSO while vapor purge operation occurs.

Turning to FIG. 8A, the commanded lambda is indicated at 220 and the measured lambda is indicated at 222. The measured lambda may be the lambda value determined by a controller which receives output from the exhaust gas sensor or may be the raw output of the exhaust gas sensor.

The arrow 202 illustrates the time delay, which is the time duration from the commanded change in lambda to a time ($\tau_0$) when a threshold change in the measured lambda is observed. The threshold change in lambda may be a small change that indicates the response to the commanded change has started, e.g., 5%, 10%, 20%, etc. The arrow 204 indicates the time constant for the response. The time constant for the response in a first order system may be the time from $\tau_0$ to when 63% of the steady state response is achieved. However, other time constant values have been contemplated. The arrow 206 indicates the line length. The line length may be the time duration from $\tau_0$ to when 95% of the desired response is achieved, otherwise referred to as a threshold response time ($\tau_{95}$). In a first order system, the threshold response time ($\tau_{95}$) is approximately equal to three time constants ($3*\tau_{63}$). However, other line length definitions have been contemplated. Generally, the line length may be determined based on the change in lambda over the duration of the response, starting at $\tau_0$. The line length may be the sensor signal length, and can be used to determine if an exhaust gas sensor response degradation is present (e.g., the exhaust gas sensor is degraded). The line length may be determined based on the equation:

$$\text{line length} = \Sigma \sqrt{\Delta t^2 + \Delta \lambda^2} \quad (1)$$

Therefore, from the aforementioned parameters, various details regarding the exhaust gas sensor response can be determined. First, the time delay, indicated by arrow 202, may be compared to an expected time delay to determine if the sensor is exhibiting a delay degradation behavior. The expected time delay may be a predetermined value. Second, the time constant, indicated by the arrow 204, may be used to predict a line length (e.g., $\tau_{95}$). The predicted line length (e.g., $\tau_{95}$) may be compared to a measured line length to determine sensor degradation. The time delay may be a duration from a commanded entry into or exit out of DFSO to a threshold change in lambda. Additionally, the line length may be determined based on a change of lambda over time in the set of exhaust gas sensor response samples.

FIG. 8B shows a graph illustrating an example exhaust gas sensor response to a commanded entry into DFSO while a vapor purge operation is occurring in the engine. The commanded lambda is indicated at 220' and the measured lambda is indicated at 222'. Line 224 indicates the lambda value of the vapor purge operation.

As shown, the measured lambda 222' reaches two plateaus after an initial increase carried out in response to the commanded signal. Thus, the measured lambda 222' remains at a first lambda value or within a first lambda value range for a first duration of time and remains at a second lambda value or within a second lambda value range for a second duration. The second lambda value or second lambda value range are greater than the first lambda value or lambda value range. In contrast, the measured lambda value 222, shown in FIG. 8A only has a single plateau. That is to say that after an initial increase in response after the commanded signal the measure lambda value 222, shown in FIG. 8A, remains within a single lambda range or at a single lambda value. Therefore, it will be appreciated that the purge operation may interfere with the line length determination of the measured lambda signal discussed above. To account for this alteration in the output signal of the exhaust gas sensor caused by purge operation a compensation factor may be applied to a line length calculation for the measured sensor output.

In one example the compensation factor may be a scaling factor that can be applied to a line length calculation (e.g., a line length calculation utilizing equation (1)). The scaling factor may be based on a lambda value corresponding to air and a lambda value corresponding to purge operation. Specifically in one example the scaling factor may be a ratio between a lambda value corresponding to air (e.g., calibrated lambda value for air) and a lambda value corresponding to the purge operation.

$$\text{scaling factor} = \frac{\lambda_{air}}{\lambda_{purge}} \quad (2)$$

In this way, the vapor purge operation's effect on the lambda value may be compensated for during sensor diagnostics, thereby reducing statistical variation in the lambda calculation and increasing the confidence of subsequent sensor diagnostic calculations, discussed in greater detail herein. In some examples, the lambda value corresponding to air may be 2.9 and the lambda value corresponding to purge operation may be 2.7. Therefore in such an example the scaling factor may be 1.07.

Further, in some examples, a set of exhaust gas sensor response samples, such as the sets shown in FIG. 8A or 8B, may be used to determine if vapor purge operation is occurring in the vehicle. For example, the vapor purge operation may be determined based on a profile of lambda values in the set of exhaust gas sensor response samples. Specifically, it may be determined that the vapor purge operation occurs if lambda values in the set of exhaust gas sensor response samples increase beyond a threshold value after a trailing value in the line length of the set of exhaust gas sensor response samples is surpassed. In other words, vapor purge operation may be determined after a second lambda plateau is reached in the set of exhaust gas sensor response samples. However, in other examples vapor purge may be indicated via the controller 12, shown in FIG. 1 in electronic communication with the purge valve 176, shown in FIG. 1.

FIG. 9 shows a method 300 for monitoring an exhaust gas sensor coupled in an engine exhaust. The method 300 may be implemented by the vehicle, engine, systems, components, etc., described above with regard to FIG. 1 or may be implemented by another suitable vehicle, engine, systems, and components. Specifically, one or more of the steps disclosed in FIG. 9 may be implemented via the controller 12 and/or controller 140, shown in FIG. 1.

At 302 the method includes determining if DFSO is occurring in the vehicle. In some examples, DFSO is a commanded DFSO transition. Further in some examples, the DFSO transition may be an entry into or an exit out of DFSO. If it is determined that DFSO is not occurring (NO at 302) the method 300 returns to the start. However, if it is determined that DFSO is occurring (YES at 302) the method proceeds to 304 where the method includes determining if a threshold number of samples has been received from the exhaust gas sensor. The threshold number of samples may be predetermined in some examples. Therefore, a set of exhaust gas sensor response samples may be received by a controller in method 300 during DFSO. The set of exhaust gas sensor response samples may include a plurality of lambda values collected at predetermined time intervals, during DFSO.

If a threshold number of samples has not been received (NO at 304) the method returns to the start. However, if a threshold number of samples has been received (YES at 304) the method advances to 306. At 306 the method includes determining if fuel vapor purge operation is occurring. In some examples, vapor purge operation is determined based on a profile of lambda values in the set of exhaust gas sensor response samples. However, in other examples, a signal from a purge valve, such as purge valve 176 shown in FIG. 1, may indicate to a controller, such as controller 12 or controller 140 shown in FIG. 1, may be used to determine if vapor purge operation is occurring. More generally, the vapor purge operation determination may be based on a profile of lambda values in the set of exhaust gas sensor response samples. In one example, it is determined that vapor purge operation occurs if lambda values in the set of exhaust gas sensor response samples increase beyond a threshold value after a trailing value in the line length of the set of exhaust gas sensor response samples is surpassed. If fuel vapor purge is occurring (YES at 306) the method advances to 308. At 308 the method adjusting a degradation algorithm. Adjusting the degradation algorithm may include at 309 determining a compensation factor for vapor purge operation. As previously discussed the compensation factor may be based on a lambda value corresponding to air and a lambda value corresponding to purge operation. In some examples, the lambda value corresponding to purge operation may be predetermined. However in other examples the lambda value corresponding to purge operation may be determined based on the degree of opening of the purge valve 176 shown in FIG. 1, the manifold air pressure, throttle position, etc. In one example, the compensation factor may be a scaling factor of the lambda value for air over the lambda value for purge operation.

Adjusting the degradation algorithm may further include at 310 applying the compensation factor (e.g., scaling factor) to a degradation algorithm. Specifically, in one example the compensation factor may be applied to a measured line length calculation. In this way, the line length may be adjusted based on vapor purge operation. The collected set or a portion of the set of exhaust gas sensor response samples may be used to calculate the line length. In this way, the compensation factor may be selectively applied to a line length of a set of exhaust gas sensor response samples collected during DFSO based on determination of vapor purge operation in an engine.

At 312 the method includes executing the adjusted degradation algorithm. Executing the adjusted degradation algorithm may include executing the degradation algorithm with the compensation factor. In some examples, the degradation algorithm may include determining an expected and measure time delay and line length for each of the samples collected during DFSO.

However, if it is determined that fuel vapor purge operation is not occurring (NO at 306) the method proceeds to 314 where the method includes inhibiting (e.g., temporarily inhibit) adjustment of the degradation algorithm. Inhibiting adjusting of the degradation algorithm may includes at 315 inhibiting application of the compensation factor (e.g., scaling factor) to the degradation algorithm. At 316 the method includes executing the non-adjusted degradation algorithm. Executing the non-adjusted degradation algorithm may include executing the degradation algorithm without the compensation factor.

At 318 the method includes determining if exhaust gas sensor degradation has occurred from the degradation algorithm executed with or without the compensation factor. In one example exhaust gas sensor degradation is indicated if at least one of the compensated line length and the time delay exceeds a predetermined threshold value. A method for determining exhaust gas sensor degradation is shown in FIG. 10 and discussed in greater detail herein.

If it is determined that the exhaust gas sensor is not degraded (NO at 318) the method includes at 319 indicating that the exhaust gas sensor is working as expected. In some examples, the method may include temporarily inhibiting adjustment of engine operation based on exhaust gas sensor degradation in response to a non-degradation determination (NO at 318) or the method may return to the start. It will be appreciated that the indication of the exhaust gas sensor degradation may be inhibited based on a time delay and a compensated (e.g., scaled) or non-compensated (e.g., non-scaled) line length of the set of exhaust gas sensor response samples which may be calculated using the diagnostic algorithm. In one example, equation (1) discussed above may be used in the diagnostic algorithm. For example, exhaust gas sensor degradation may be inhibited from indication if at least one of the scaled line length and the time delay is below a predetermined threshold value. Further in some examples, exhaust gas sensor degradation may be determined based on a scaled line length during entry into DFSO and an non-scaled line length during exit out of DFSO, vapor purge during the entry into DFSO and vapor purge not occurring during the exit out of DFSO. In this way, two measured line lengths may be used to determine exhaust gas sensor degradation. Additionally, indication may be temporarily inhibited for the iteration of the diagnostic routine or a predetermined period of time, for example. In this way, selectively inhibit indication of exhaust gas sensor degradation based on a time delay and the scaled line length of the set of exhaust gas sensor response samples. When the scaled line length is used to determine exhaust gas sensor degradation the method may be used over a wider range of operating conditions in the engine when compared to diagnostic routines which may inhibit sensor diagnostics during purge operation. As a result, the periods of sensor malfunction without degradation identification are reduced. Furthermore, the confidence of the sensor diagnostic method is increased when a scaling factor is used. However, in other examples step 319 may be omitted from the method 300.

However, if it is determined that exhaust gas sensor degradation has occurred (YES at 318) the method includes at 320 responding to the degradation. Responding to the degradation may include adjusting engine operation. It will be appreciated that the exhaust gas sensor degradation is determined during DFSO. Responding to the degradation may include at 321 indicating exhaust gas sensor degradation. The indication may be a visual indication, such as a warning light, displayed in a cabin of the vehicle to the driver. Additionally or alternatively an audio indication may be provided. Indicating exhaust sensor degradation may also include setting a flag in a controller or providing other indications in a controller. Adjusting engine operation may include at 322 adjusting a fuel injection amount and/or a fuel injection timing. In this way, at least one of an amount of fuel injection and a timing of fuel injection in the engine may be adjusted in response to indicating exhaust gas sensor degradation.

FIG. 10 is a flow chart illustrating a method 400 for determining a sensor degradation behavior based on determined and expected time delays and line lengths during exit and entry into DFSO. The method 400 may be implemented by the vehicle, engine, systems, components, etc., described above with regard to FIG. 1 or may be implemented by another suitable vehicle, engine, systems, and components. Specifically, one or more of the steps disclosed in FIG. 10 may be implemented via the controller 12 and/or controller 140, shown in FIG. 1. At 402, method 400 includes comparing measured entry time delay and exit time delay to the expected entry time delay and exit time delay. In some examples, for both entry into and exit out of DFSO, an expected and measured time delay and line length may be determined for each sample collection during DFSO exit and entry. Each measured time delay may be compared to its respective expected time delay to determine a difference in the time delays. As shown, both the entry into and exit out of DFSO are used in the diagnostic method. However, it will be appreciated that just the entry into or the exit out of DFSO may be used in the diagnostic method in other examples.

At 404, it is determined if both the entry and exit time delays are greater than their respective expected time delays by a threshold amount. The threshold amount may be a suitable amount, such as 5% or 10%, that allows for some variation in the exhaust gas sensor response that does not affect drivability or emissions, and allows for error in the expected time delays. If both the entry and exit time delays are greater than their respective expected time delays (YES at 404), a symmetric delay degradation behavior is indicated at 406, and method 400 proceeds to 408. If both are not greater than their respective expected time delays (NO at 404), method 400 also proceeds to 408 to determine if one of the entry or exit time delays is greater than its respective expected time delay. If no (NO at 408), method 400 proceeds to 412. If yes (YES at 408), method 400 proceeds to 410 to indicate an asymmetric delay degradation. If the entry time delay is greater than expected, a rich-to-lean delay degradation is indicated. If the exit time delay is greater than expected, a lean-to-rich delay degradation is indicated. Method 400 then proceeds to 412.

At 412, the measured entry line length is compared to the expected entry line length, and the measured exit line length is compared to the expected exit line length. As previously discussed, a compensation factor may be applied to one or both of the line lengths if vapor purge operation is being implemented during the DFSO transition. For example, a compensation factor may be applied to a measured line length calculation (e.g., equation (1)) if it is determined that vapor purge is occurring during a DFSO transition (e.g., entry into or exit out of DFSO). Specifically, if it is determined that vapor purge operation occurs during entry into DFSO a compensation factor may be applied to the measured line length calculation for the entry. However, if it is determined that vapor purge operation does not occur during exit out of the same DFSO, the measured line length calculation for the exit is not compensated. In this way, the compensation is applied to diagnostics (e.g., a measured line length calculation) based on occurrence of vapor purge operation during DFSO. As previously discussed the compensation factor may be determined based on a lambda value corresponding to air and a lambda value corresponding to vapor purge operation (e.g., equation (2)).

At 414, it is determined if both the entry and exit line lengths are greater than their respective expected line lengths by a threshold amount, similar to the determination made at 404.

If both are greater than expected (YES at 414), method 400 proceeds to 416 to indicate a symmetric filter degradation, and then method 400 proceeds to 418. If no (NO at 414), method 400 proceeds to 418 to determine if one of the entry or exit line lengths is greater than its respective expected line length. It will be appreciated that if a measured line length is compensated it may affect the degradation determination.

If it is determined that one of the entry or exit line lengths is greater than expected (YES at 418), method 400 proceeds to 420 to indicate an asymmetric filter degradation. If the entry line length is greater than expected, a rich-to-lean filter degradation is indicated. If the exit line length is greater than expected, a lean-to-rich filter degradation is indicated. Method 400 then proceeds to 422. Also, if the answer is no at 418, method 400 proceeds to 422 to determine if at least one degradation behavior is indicated, based on the previous comparisons of the time delays and line lengths. If at least one degradation behavior is indicated, method 400 exits. If no degradation is indicated, method 400 proceeds to 424 to indicate no degradation behavior, and then method 400 exits.

FIGS. 1-10 provide for a method of monitoring an exhaust gas sensor coupled in an engine exhaust. The method comprises during a first deceleration fuel shut-off (DFSO) transition, applying a first scaling factor to a first line length of a first set of exhaust gas sensor response samples when fuel vapor purge operation occurs during the first DFSO transition. The method further comprises, during a second DFSO transition, inhibiting application of a second scaling factor to a second line length of a second set of exhaust gas sensor response samples when fuel vapor purge operation does not occurs during the second DFSO transition. The method further comprises determining exhaust gas sensor degradation based on the first and second line lengths and if exhaust gas sensor degradation is determined, adjusting engine operation or indicating the degradation. In this way, data from both entry into and exit out of DFSO may be used to determine exhaust gas sensor degradation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring an exhaust gas sensor coupled in an engine exhaust in an engine, comprising:
adjusting engine operation responsive to exhaust gas sensor degradation, the degradation identified during deceleration fuel shut-off (DFSO) and compensated based on whether vapor purge operation occurs during DFSO.

2. The method of claim 1, where adjusting engine operation responsive to exhaust gas sensor degradation includes adjusting at least one of an amount of fuel injection and a timing of fuel injection in the engine in response to indicating exhaust gas sensor degradation, the method further comprising indicating the exhaust gas sensor degradation.

3. The method of claim 1, where the exhaust gas sensor degradation compensation includes applying a compensation factor to a line length of a set of exhaust gas sensor response samples collected during DFSO when it is determined that vapor purge operation occurs during DFSO.

4. The method of claim 3, where the engine operation is adjusted based on the compensated line length and a time delay of the set of exhaust gas sensor response samples.

5. The method of claim 4, where engine operation is adjusted if at least one of the compensated line length and the time delay exceed a predetermined threshold value.

6. The method of claim 3, where the compensation factor is determined based on a lambda value corresponding to air and a lambda value corresponding to purge operation.

7. The method of claim 3, where vapor purge operation is determined based on air-fuel ratios in the set of exhaust gas sensor response samples.

8. The method of claim 7, where the vapor purge operation determination is based on a profile of lambda values in the set of exhaust gas sensor response samples.

9. The method of claim 7, where vapor purge operation is determined to occur if lambda values in the set of exhaust gas sensor response samples increase beyond a threshold value.

10. The method of claim 9, where the threshold value occurs after a trailing lambda value of a line length of the set of exhaust gas sensor response samples is surpassed.

11. The method of claim 1, where DFSO is a DFSO transition comprising entry into or exit out of DFSO.

12. The method of claim 1, where set of exhaust gas sensor response samples includes a plurality of lambda values collected at predetermined time intervals.

13. A system for a vehicle, comprising:
an engine including a fuel injection system;
an exhaust gas sensor coupled in an exhaust system of the engine; and
a controller including instructions stored in memory executable by a processor to:
during a deceleration fuel shut-off (DFSO) transition, if fuel vapor purge operation occurs during the DFSO transition then adjust a line length of a set of exhaust gas sensor response samples collected during DFSO; and selectively inhibit indication of exhaust gas sensor degradation based on a time delay and the adjusted line length of the set of exhaust gas sensor response samples.

14. The system of claim 13, where the DFSO transition is entry into or exit out of DFSO operation.

15. The system of claim 13, where the time delay is a duration from a commanded entry into or exit out of DFSO to a threshold change in lambda, and where the line length is determined based on a change of lambda over time in the set of exhaust gas sensor response samples.

16. The system of claim 13, where the fuel vapor purge operation is determined based on a profile of lambda values in the set of exhaust gas sensor response samples.

17. The system of claim 13, where exhaust gas sensor degradation is inhibited from indication if at least one of the adjusted line length and the time delay is below a predetermined threshold value.

18. The system of claim 13, where the exhaust gas sensor is an air-fuel sensor.

19. A method of monitoring an exhaust gas sensor coupled in an engine exhaust, comprising:

during a first deceleration fuel shut-off (DFSO) transition, applying a first scaling factor to a first line length of a first set of exhaust gas sensor response samples when fuel vapor purge operation occurs during the first DFSO transition;

during a second DFSO transition, inhibiting application of a second scaling factor to a second line length of a second set of exhaust gas sensor response samples when fuel vapor purge operation does not occurs during the second DFSO transition; and indicating exhaust gas sensor degradation based on the first and second line lengths.

20. The method of claim 19, further comprising adjusting engine operation including adjusting at least one of a fuel injection amount and a fuel injection timing in an engine.

* * * * *

UNITED STATES PATENT AND TRADEMARK OFFICE
CERTIFICATE OF CORRECTION

PATENT NO. : 9,188,045 B2  
APPLICATION NO. : 13/599744  
DATED : November 17, 2015  
INVENTOR(S) : Adam Nathan Banker et al.

Page 1 of 1

It is certified that error appears in the above-identified patent and that said Letters Patent is hereby corrected as shown below:

On the title page item 75, the second inventor's name should read "Uhrich; Michael James"

Signed and Sealed this
Twenty-eighth Day of June, 2016

Michelle K. Lee
*Director of the United States Patent and Trademark Office*